April 16, 1935.　　　　H. TONJES, JR　　　　1,998,032
PLOW HITCH
Filed April 17, 1934　　　3 Sheets-Sheet 1
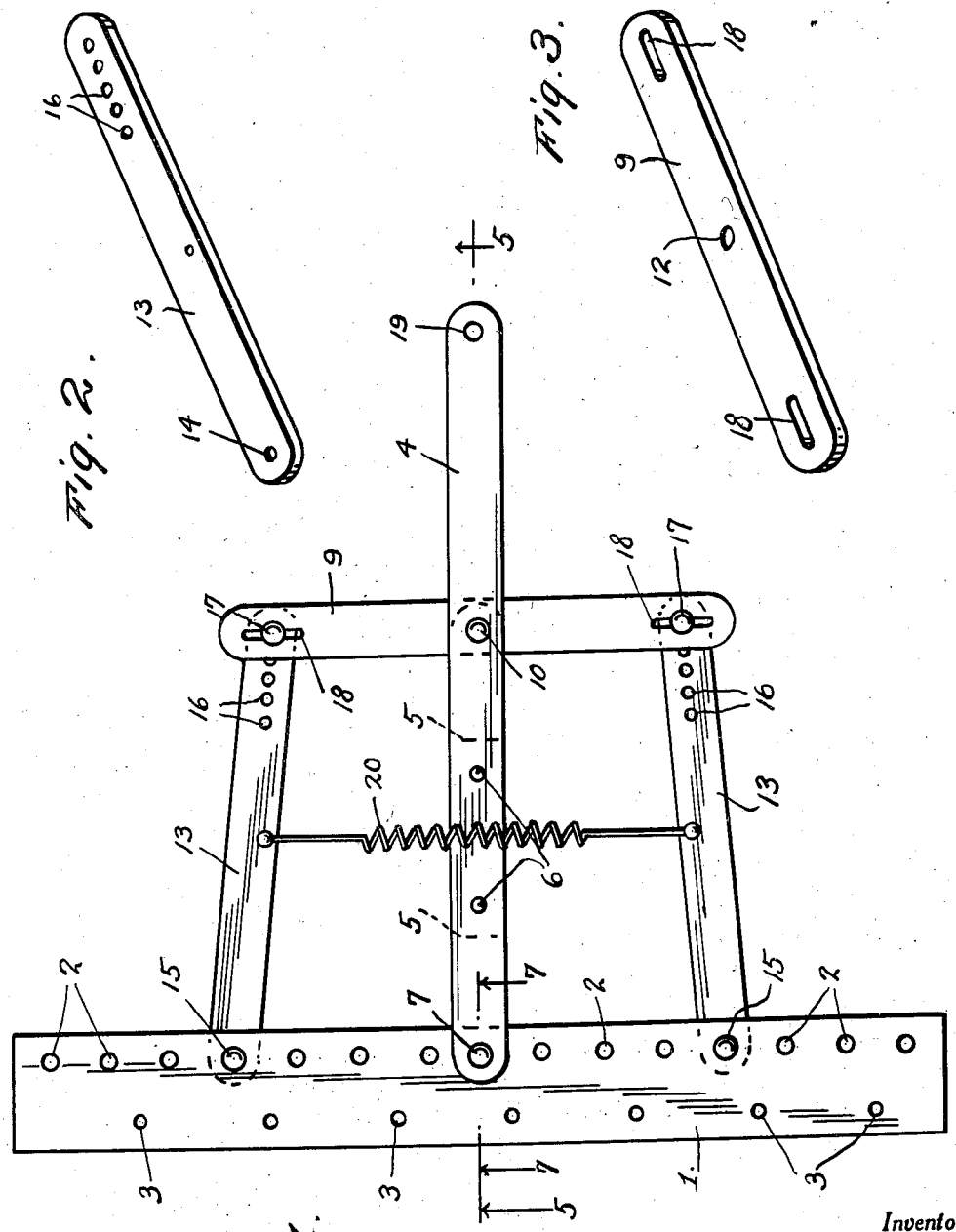
Inventor
Henry Tonjes, Jr.
By Clarence A. O'Brien
Attorney April 16, 1935.  H. TONJES, JR  1,998,032
PLOW HITCH
Filed April 17, 1934  3 Sheets-Sheet 2
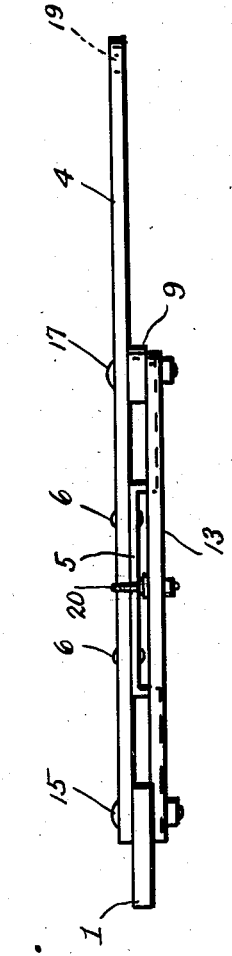
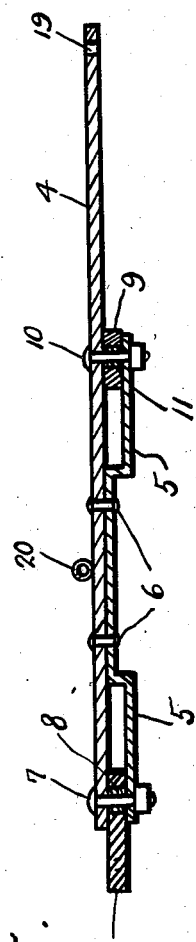
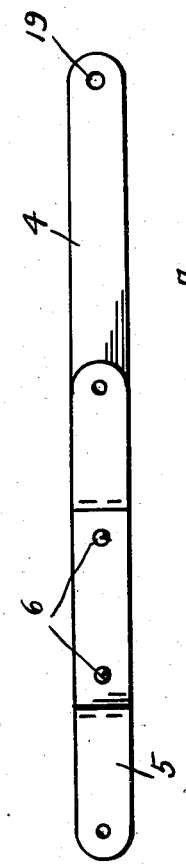
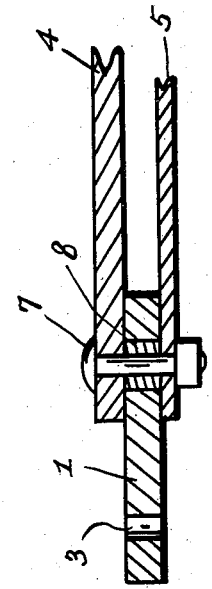
Inventor
Henry Tonjes, Jr.
By Clarence A. O'Brien
Attorney Patented Apr. 16, 1935

1,998,032

UNITED STATES PATENT OFFICE 1,998,032

PLOW HITCH

Henry Tonjes, Jr., Wisner, Nebr.

Application April 17, 1934, Serial No. 721,017

4 Claims. (Cl. 280—33.44)

This invention relates to a plow hitch which is mainly designed for attaching plows to a tractor, the general object of the invention being to so form the hitch that the plow remains in the furrow in all kinds of ground and will not make too big a furrow and the plow will make a clean sweep around corners and eliminate the extra plowing of corners which packs the ground. The device will also cause the plow to plow closer to the ends of strips of ground, when the ground is being plowed in strips, than is possible with the type of hitch now in use.

This invention also consists in certain other features of construction and in the combination and arrangement of the several parts, to be hereinafter fully described, illustrated in the accompanying drawings and specifically pointed out in the appended claims.

Figure 12:
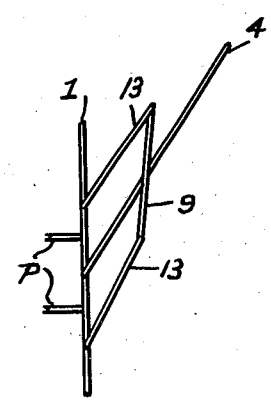

In describing the invention in detail, reference will be had to the accompanying drawings wherein like characters denote like or corresponding parts throughout the several views, and in which:

Figure 1 is a top plan view of the invention.
Figure 2 is a view of one of the side bars.
Figure 3 is a view of the front end bar.
Figure 4 is an edge view of Figure 1.
Figure 5 is a section on line 5—5 of Figure 1.
Figure 6 is a bottom plan view of the center member.
Figure 7 is a section on line 7—7 of Figure 1.
Figures 8, 9, 10 and 11 are diagrammatic plan views showing how the parts of the invention are adjusted when used with different sizes of tractors and different numbers of plows.
Figure 12 is a similar view showing the position of the parts when a turn is being made.

In these drawings, the numeral 1 indicates a wide bar having a longitudinally extending row of large holes 2 adjacent one edge thereof and a longitudinally extending row of smaller holes 3 adjacent the other side edge, these holes 3 being spaced farther apart than the holes 2 and they alternate with certain pairs of the holes 2, as clearly shown in Figure 1. A center bar 4 has the central portion of a short bar 5 connected therewith by the rivets 6, as more clearly shown in Figures 4 and 5 and the end parts of this bar 5 are offset downwardly, with an end of one offset portion passing under a part of the wide bar 1, with the adjacent end of the bar 4 resting on a part of the bar 1, as shown in Figures 4 and 5. A bolt 7 passes through the adjacent ends of the bars 4 and 5 and through one of the holes 2 of the wide bar 1 and a bushing 8 is placed in the hole and the bolt passes through the same. A cross bar 9 has its central portion passing between the bar 4 and the other offset end part of the bar 5 and a bolt 10 passes through these parts and has a bushing 11 thereon which is located in a central hole 12 in the cross bar 9.

A pair of side bars 13 connects the ends of the cross bar 9 with the wide bar 1 and each bar 13 has a hole 14 in one end for receiving a bolt 15 which also passes through one of the holes 2 and the other end of each bar 13 is formed with a longitudinally extending row of holes 16, any one of which is adapted to receive a bolt 17 which passes through a slot 18 formed at each end of the bar 9. All of the bolts are adapted to receive bushings, as shown in Figures 5 and 7. As will be seen, the center bar 4 extends a considerable distance beyond the cross bar 9 and has a hole 19 adjacent the end thereof.

As will be understood, the hole 19 is to receive part of a clevis or the like which is connected with the tractor and the holes 3 of the wide bar 1 are adapted to receive the connecting means of the plows.

A spring 20 has its ends connected with the bars 13 and extends across the bar 4.

The bolts 7, 10, 15 and 17 form pivots and the plurality of holes 2 and 3 permit adjustment of the bars 4, 9 and 13 in accordance with the width of the tractor, the width of the plows and the number of plows being used, it being understood that in devices of this nature a wheel of the tractor runs in a previously formed furrow. Thus, for instance, if but a few plows are being used, the frame composed of the bars 4, 9 and 13 can be adjusted closer to one end of the bar 1 than the other end and the plows attached to said bar in such a position that the strain is equally distributed to the frame. In turning corners, when the tractor takes the turn, the bars 4, 9 and 13 tilt toward the turn so that the plows will continue to move in a substantially straight line as the tractor takes the turn and the slots 18 in the bar 9 and the spring 20 facilitate this movement of the parts when a turn is being made.

As before stated, this hitch will keep the plows in the furrow in all kinds and conditions of ground and will prevent the plows from making too big a furrow. It also causes the plows to make a clean sweep around corners as the tractor is turning and thus eliminates extra plowing of corners which tends to pack the soil. Thus the hitch will enable a field to be plowed with the tractor and plows going around and around the field with the corners properly plowed. When plowing a field in strips, the plows will continue to the ends of the strips some time after the tractor is making the turn, thus leaving less ground unplowed.

The longitudinally extending slots 18 in the bar 9 for receiving the pivot pins 17 permit a shorter turn to be made when the hitch is set toward one side, as when a pin 17 is located in one of the holes 16 of one bar 13 which is rearwardly of the hole in which the other pin 17 is placed in the other bar 13. By adjusting the pins 17 in the holes 16 of the two bars 13, the device can be used on different widths of plows and different widths of tractors. For instance, when a narrow tractor is being used, the bar 9 can be tilted by adjusting the pins 17 in the holes 16 of the two bars 13 so that the draw bar 4 is held in a tilted position and thus one wheel of the tractor can run in a furrow, while the plows are plowing other furrows, one of which will be parallel to the furrow in which the tractor wheel is running. If a wide tractor is being used with a narrow gang of plows, then the bar 9 would be tilted in an opposite direction so that one wheel of the tractor can run in a furrow, while the plows will be close to the ground previously plowed. The spring 20 acts to adjust the pins 17 in the slots 18 when a turn is being made and this hitch will permit the tractor and plows to be backed so that if the plows should stick, the tractor can be backed to clear the plows without lifting the plows.

Figure 8:
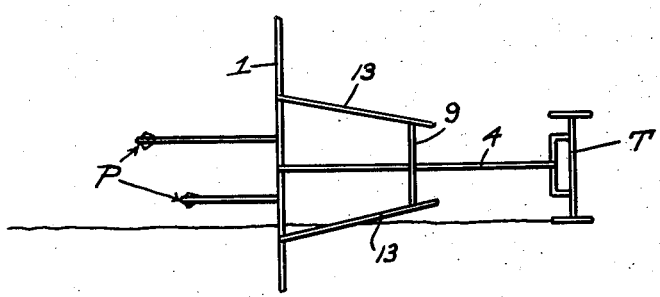
Figure 9:
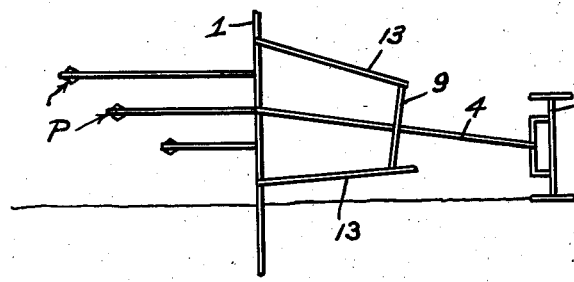
Figure 10:
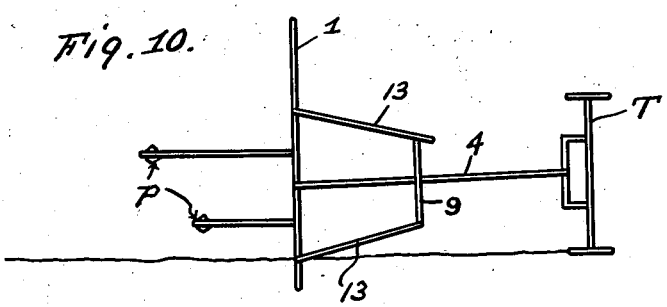
Figure 11:
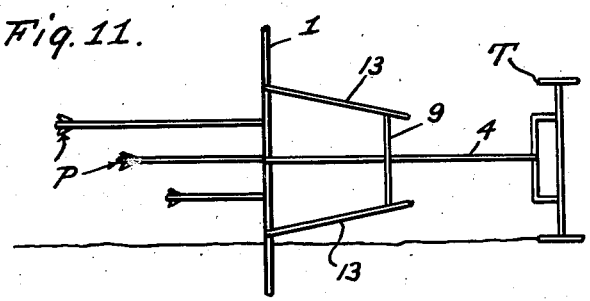

Figure 8 shows a narrow tractor T having one wheel running in a previously formed furrow with two plows P attached to the bar 1. In order to equalize the strain and cause the plows to correctly plow the ground the members 13 and 4 are adjusted toward the right hand end of the bar 1 and the pivot bolts which connect the bar 9, with the bars 13 are placed in intermediate holes 16. When three plows are attached to the bar 1 the members or bars 13 and 4 are shifted toward the left hand end of the bar 1 and the bar 9 tilted by having its left end pivoted by bolt 17 in the outermost hole 16 of the left bar 13 and the pivot pin at the other end of the bar 9 in one of the rear holes 16 so that the bar 4 slopes forwardly toward the furrow as shown in Figure 9. Figure 10 shows a wider tractor used with two plows and in this case the bars 4 and 13 are placed toward the right hand end of the bar 1 and the bar 4 slightly tilts forwardly away from the furrow as shown in Figure 10. In Figure 11 a wide tractor is shown as pulling three plows and the parts are centrally arranged as shown.

As before stated this invention provides a multiplicity of adjustments to suit the width of the tractor being used and the number and sizes of the plows attached to the hitch.

Figure 12 shows the position of the parts when the tractor is making a left turn, the bars 4 and 13 tilting toward the turn but the plows continuing to run straight, with the slots 18 for the pivot bolts 17 and the spring 20 facilitating this movement of the parts when a turn is being made.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A hitch of the class described comprising a wide bar having a longitudinally extending row of holes adjacent each side edge thereof, a center bar, a pivot passing through one end thereof and any one of certain ones of the holes adjacent one side edge of the wide bar, a cross bar pivotally connected to the center bar intermediate the ends of the center bar and at the center of the cross bar, and a pair of bars pivotally connected to the ends of the cross bar and to the wide bar, the last mentioned pivot passing through certain of the holes in the last mentioned row of holes.

2. A hitch of the class described comprising a wide bar having a longitudinally extending row of holes adjacent each side edge thereof, a center bar, a pivot passing through one end thereof and any one of certain ones of the holes adjacent one side edge of the wide bar, a cross bar pivotally connected to the center bar intermediate the ends of the center bar and at the center of the cross bar, a pair of bars pivotally connected to the ends of the cross bar and to the wide bar, the last mentioned pivot passing through certain of the holes in the last mentioned row of holes, said side bars each having a longitudinally extending row of holes, any one of which is adapted to receive the pivots at the ends of the cross bar.

3. A hitch of the class described comprising a wide bar having a longitudinally extending row of holes adjacent each side edge thereof, a center bar, a pivot passing through one end thereof and any one of certain ones of the holes adjacent one side edge of the wide bar, a cross bar pivotally connected to the center bar intermediate the ends of the center bar and at the center of the cross bar, a pair of bars pivotally connected to the ends of the cross bar and to the wide bar, the last mentioned pivot passing through certain of the holes in the last mentioned row of holes, and a short bar having an upwardly offset central portion fastened to a portion of the center bar, with one end part passing under the wide bar and receiving the pivot which connects the center bar to said wide bar, the other end portion of the short bar passing under the cross bar and receiving the pivot which connects the cross bar with the center bar.

4. A hitch of the class described comprising a wide bar, a draw bar having one end pivoted to the wide bar, a cross bar having its central portion pivoted to the draw bar intermediate the ends of said draw bar, said cross bar having longitudinally extending slots in its ends, a pair of side bars pivoted to the wide bar and each having a longitudinally extending row of holes in its other end, and pivot pins passing through the slots into certain ones of said holes, and a spring connecting the side bars together.

HENRY TONJES, Jr.